(12) United States Patent
Ito et al.

(10) Patent No.: US 8,300,926 B2
(45) Date of Patent: Oct. 30, 2012

(54) IMAGE PROCESSING APPARATUS AND IMAGE PROCESSING METHOD

(75) Inventors: Yasuhiro Ito, Yokohama (JP); Kotaro Yano, Tokyo (JP)

(73) Assignee: Canon Kabushiki Kaisha (JP)

( * ) Notice: Subject to any disclaimer, the term of this patent is extended or adjusted under 35 U.S.C. 154(b) by 780 days.

(21) Appl. No.: 12/499,630

(22) Filed: Jul. 8, 2009

(65) Prior Publication Data
US 2010/0007762 A1      Jan. 14, 2010

(30) Foreign Application Priority Data
Jul. 9, 2008   (JP) .................................. 2008-179458

(51) Int. Cl.
*G06K 9/00* (2006.01)

(52) U.S. Cl. ........ 382/162; 382/164; 382/167; 382/118; 382/190; 382/173

(58) Field of Classification Search .................. 382/103, 382/115, 113, 117, 118, 162, 164, 167, 244, 382/190, 173, 305; 348/222.1, 231.99
See application file for complete search history.

(56) References Cited

U.S. PATENT DOCUMENTS

| 6,157,744 | A | 12/2000 | Nagasaka et al. |
| 6,430,222 | B1 * | 8/2002 | Okada ..................... 375/240.03 |
| 7,003,156 | B1 | 2/2006 | Yamamoto et al. |
| 2003/0103652 | A1 * | 6/2003 | Lee et al. ..................... 382/118 |
| 2008/0260255 | A1 * | 10/2008 | Fukushima et al. .......... 382/190 |
| 2009/0225226 | A1 * | 9/2009 | Kakuta ......................... 348/655 |

FOREIGN PATENT DOCUMENTS

| JP | 8227462 A | 9/1996 |
| JP | 10112835 A | 4/1998 |
| JP | 10-224736 A | 8/1998 |
| JP | 2000-222584 A | 8/2000 |
| JP | 2001167110 A | 6/2001 |

OTHER PUBLICATIONS

Rowley et al., "Neural network-based face detection", IEEE Transactions on Pattern Analysis and Machine Intelligence, vol. 20 No. 1, Jan. 1998.
Yang et al., "Detecting Faces in Images: A Survey", IEEE Transactions on Pattern Analysis and Machine Intelligence, vol. 24, No. 1, Jan. 2002.
Japanese Office Action issued in counterpart application No. JP2008-179458, dated Jun. 18, 2012.

* cited by examiner

*Primary Examiner* — Ali Bayat
(74) *Attorney, Agent, or Firm* — Rossi, Kimms & McDowell LLP (57) ABSTRACT

A cut point detection unit segments a frame sequence including successive frames into one or more subframe sequences. A face discrimination unit identifies an image group in which an object registered in advance appears, of images of respective frames that form one subframe sequence, and a representative frame candidate extraction unit selects one image from the identified image group as a selection image. A representative frame display control unit controls a display unit to display selection images for respective subframe sequences as representative images of the frame sequence.

6 Claims, 6 Drawing Sheets

IMAGE PROCESSING APPARATUS AND IMAGE PROCESSING METHOD

BACKGROUND OF THE INVENTION

1. Field of the Invention

The present invention relates to an image processing technique.

2. Description of the Related Art

An image search apparatus which records representative images for a moving image is disclosed in, for example, Japanese Patent Laid-Open No. 2000-222584 (to be referred to as patent reference 1 hereinafter). With the technique disclosed in patent reference 1, a specific object is detected from each frame which forms a moving image, and a feature amount associated with the detected object, that associated with the background, and the difference between the object and background are recorded outside the moving image.

A method of extracting a frame including a predetermined object image as a representative frame is disclosed in, for example, Japanese Patent Laid-Open No. 10-224736 (to be referred to as patent reference 2 hereinafter). With the technique disclosed in patent reference 2, whether or not a partial region in an image includes a specific object is evaluated using a dictionary. Then, a frame which is evaluated to be closer to that registered in the dictionary is extracted as a representative frame.

However, since the technique disclosed in patent reference 1 detects a specific object using a motion vector, when a motionless region in an image includes the specific object, that object cannot be detected. For this reason, although the redundancy of the entire image is reduced, the contents of a moving image itself cannot be recognized. Therefore, it is difficult to play back or edit the moving image for an optimal time according to the object contents.

With the technique disclosed in patent reference 2, since only a given area is evaluated, representative frames may often include similar image patterns. In this case, even when such moving image period is searched, a large number of representative frames having nearly the same contents are generated, and this technique is not suited to recognize the contents in a moving image. For this reason, it is not easy to play back or edit the moving image from an optimal time according to the object contents.

SUMMARY OF THE INVENTION

The present invention has been made in consideration of the aforementioned problems, and provides a technique which acquires representative images that represent a moving image as more precise representative images in consideration of the contents of the moving image.

According to the first aspect of the present invention, an image processing apparatus comprises: a segmentation unit which segments a frame sequence including successive frames into one or more subframe sequences; a selection unit which, for each of the one or more subframe sequences, identifies an image group, in which an object registered in advance appears, of images of respective frames that form one subframe sequence, and selects one image from the identified image group as a selection image; and an output unit which outputs selection images selected for respective subframe sequences by the selection unit as representative images of the frame sequence.

According to the second aspect of the present invention, an image processing method comprises: a segmentation step of segmenting a frame sequence including successive frames into one or more subframe sequences; a selection step of, for each of the one or more subframe sequences, identifying an image group, in which an object registered in advance appears, of images of respective frames that form one subframe sequence, and selecting one image from the identified image group as a selection image; and an output step of outputting selection images selected for respective subframe sequences in the selection step as representative images of the frame sequence.

Further features of the present invention will become apparent from the following description of exemplary embodiments with reference to the attached drawings.

DESCRIPTION OF THE EMBODIMENTS

Embodiments of the present invention will be described in detail hereinafter with reference to the accompanying drawings. Note that these embodiments will be explained as examples of the arrangements of the invention described in the scope of claims, and that invention is not limited to the embodiments to be described hereinafter.

[First Embodiment]

In this embodiment, a human face is used as an object. However, it is obvious for those who are skilled in the art that the same description as the following description applies even if an object is other than a human face.

Therefore, under such condition, this embodiment segments a frame sequence including successive frames that form a moving image into one or more subframe sequences, and obtains and displays representative images for respective segmented subframe sequences.

Figure 1:
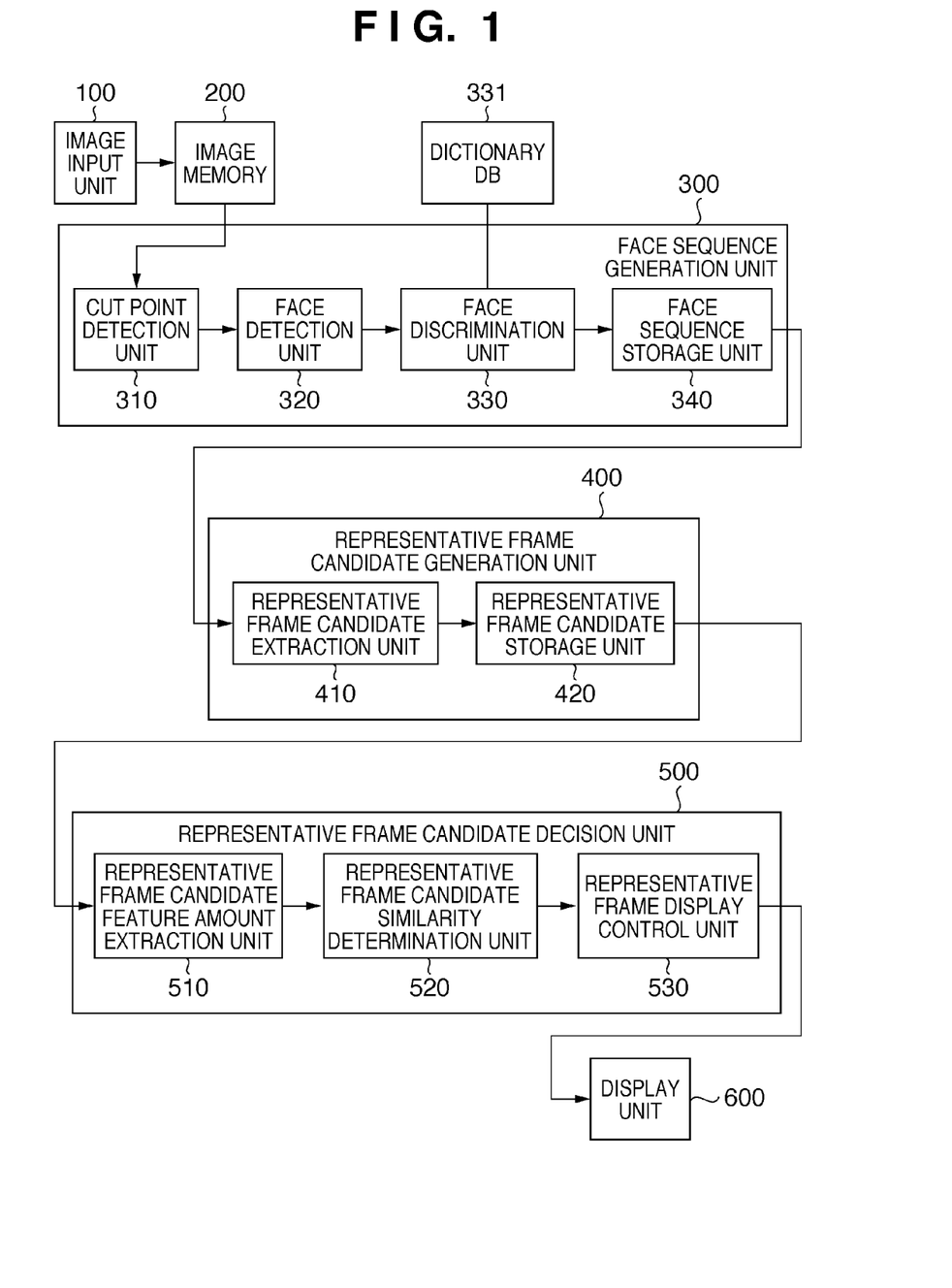
FIG. 1 is a block diagram showing an example of the functional arrangement of an image processing apparatus according to the first embodiment of the present invention.

FIG. 1 is a block diagram showing an example of the functional arrangement of an image processing apparatus according to this embodiment. As shown in FIG. 1, the image processing apparatus according to this embodiment includes an image input unit 100, image memory 200, face sequence generation unit 300, dictionary DB (database) 331, representative frame candidate generation unit 400, representative frame candidate decision unit 500, and display unit 600. These units will be described below.

The image input unit 100 is used to input moving image data and to store the input moving image data in the subsequent image memory 200, and includes, for example, a camcorder. However, the input mode of moving image data is not particularly limited. For example, moving image data sensed by an image sensing device such as a video camera may be acquired from this image sensing device directly or via a network, or may be acquired from a hard disk drive which stores and holds moving image data generated in advance. Of course, as the image input unit 100, one according to such acquisition mode of a moving image is used. As is well known, moving image data includes data of an image group of a plurality of frames.

The image memory 200 is used to store the moving image data output from the image input unit 100.

The face sequence generation unit 300 reads out data of a moving image from the image memory 200, analyzes image data of respective frames which form the readout moving image, and outputs the analysis result to the subsequent representative frame candidate generation unit 400 together with image data of respective frames. As shown in FIG. 1, the face sequence generation unit 300 includes a cut point detection unit 310, face detection unit 320, face discrimination unit 330, and face sequence storage unit 340.

The cut point detection unit 310 executes processing for segmenting a frame sequence which forms moving image data read out from the image memory 200 into one or more subframe sequences. In this processing, a moving image is segmented for respective scenes to generate subframe sequences for respective scenes. In the processing for segmenting a moving image into one or more subframe sequences, images are referred to in turn from a start frame, and a color correlation value is calculated between the current reference frame image and the immediately preceding reference frame image. When the calculated correlation value is smaller than a threshold, the current reference frame image is determined as a division frame, which is set as a start frame of a new subframe sequence. On the other hand, when the calculated correlation value is equal to or larger than the threshold, the current reference frame is set as a trailing end frame of a subframe sequence to which the immediately preceding reference frame image belongs. With this processing, since one or more division frames are provided to the frame sequence, one subframe sequence can be defined by frames from one division frame to a frame immediately before the next division frame. In other words, in this processing, a color correlation value is calculated between an x (x=1, 2, . . . )-th frame image and an (x+1)-th frame image, and when the calculated correlation value is equal to or larger than the threshold, the x-th frame image and (x+1)-th frame image are included in an identical subframe sequence. On the other hand, when the correlation value is smaller than the threshold, the (x+1)-th frame image is included in a subframe sequence different from that to which the x-th frame image belongs. Note that the method of segmenting one frame sequence into one or more subframe sequences is not limited to the aforementioned method.

The face detection unit 320 executes the following processing for each subframe sequence. That is, the face detection unit 320 refers to images of respective frames which form each subframe sequence, and detects face regions from the images which are referred to. Then, the face detection unit 320 outputs information including the positions and sizes of face regions, the detected frame numbers, and the like (face region information) to the subsequent face discrimination unit 330 together with data of the images of the respective frames which form the subframe sequence. Note that the face region information is used to identify a frame, and the position and size of a region in an image, which includes a face image. Hence, pieces of information included in the face region information are not particularly limited as long as such points can be identified. As for a frame image which does not include any face region, information indicating that no face region is detected is output as face region information. That is, the face detection unit 320 outputs a set of image data and face region information for each frame which forms a subframe sequence.

The face discrimination unit 330 reads out human face data (dictionary data), which is registered in advance, from the dictionary DB 331. The dictionary data includes data used to identify predetermined human faces such as data used to identify the face of Mr. A, that used to identify the face of Mr. B, and so forth. Then, the face discrimination unit 330 executes the following processing for each subframe sequence. That is, the face discrimination unit 330 refers to pieces of face region information of frames which form one subframe sequence, and identifies frames from which face regions are detected. The face discrimination unit 330 identifies a face region in a given identified frame with reference to the face region information of that frame. The face discrimination unit 330 determines whether or not a face in the identified face region is that indicated by the dictionary data. If the face in the identified face region is, for example, that of Mr. A, the face discrimination unit 330 outputs a set of the face region information of this frame and a code associated with "face of Mr. A" (face code) to the face sequence storage unit 340 as face sequence information. On the other hand, when the face in the identified face region is, for example, that of Mr. B, the face discrimination unit 330 outputs a set of the face region information of this frame and a code associated with "face of Mr. B" to the face sequence storage unit 340 as face sequence information. In this manner, when a face in the identified face region matches a face which is registered in advance, the face discrimination unit 330 outputs a set of the face region information of this frame and a code associated with that face to the face sequence storage unit 340 as face sequence information.

In this way, in the face sequence information, information used to identify a frame, and a person, position, and size of a face included in that frame in a frame group which forms one subframe sequence is registered. The face discrimination unit 330 executes such processing for respective subframe sequences.

The face sequence storage unit 340 stores the face sequence information for each subframe sequence received from the face discrimination unit 330. Note that the information received from the face discrimination unit 330 may be stored in an external memory.

The representative frame candidate generation unit 400 identifies representative images for respective subframe sequences (representative frame candidates of a moving image) using the face sequence information stored in the face sequence storage unit 340 for respective subframe sequences. As shown in FIG. 1, the representative frame candidate generation unit 400 includes a representative frame candidate extraction unit 410 and representative frame candidate storage unit 420.

The representative frame candidate extraction unit 410 executes the following processing for each subframe sequence. The representative frame candidate extraction unit 410 counts the number of face codes recorded in respective pieces of face sequence information with reference to the face sequence information stored in the face sequence storage unit 340 in correspondence with one subframe sequence. That is, the representative frame candidate extraction unit 410 counts how many faces registered in advance appear in each frame, which includes images of the faces registered in advance. The representative frame candidate extraction unit 410 selects a frame including a largest number of face images (faces which are registered in the dictionary data) as a selection frame (selection image). If there is a plurality of selection frame candidates, the representative frame candidate extraction unit 410 selects a frame having a smallest frame number (closest to the start frame) as a selection frame. Since one selection frame is selected per subframe sequence, the representative frame candidate extraction unit 410 executes such processing for respective subframe sequences, thus deciding one selection frame per subframe sequence. The representative frame candidate extraction unit 410 makes image data of the selection frames for respective subframe sequences, and face sequence information store in the representative frame candidate storage unit 420.

The representative frame candidate decision unit 500 selects only selection frames which are not similar to other selection frame images, and decides the selected selection frames as "representative frames which represent the moving image". The representative frame candidate decision unit 500 displays the decided representative frame images on the subsequent display unit 600. As shown in FIG. 1, the representative frame candidate decision unit 500 includes a representative frame candidate feature amount extraction unit 510, representative frame candidate similarity determination unit 520, and representative frame display control unit 530.

Upon reception of image data of the selection frames, the representative frame candidate feature amount extraction unit 510 executes the following processing for each image data. That is, the representative frame candidate feature amount extraction unit 510 calculates an average pixel value of pixels which form an area (background area) other than a face region of one image. The face region of this image is recorded in face sequence information corresponding to a subframe sequence to which this image belongs.

The representative frame candidate similarity determination unit 520 calculates correlation values between the average pixel value calculated for the selection frame with the smallest frame number and those calculated for other selection frames. The representative frame candidate similarity determination unit 520 outputs an image of the selection frame whose correlation value with the average pixel value, which is calculated for the selection frame with the smallest frame number, is smaller than a threshold, and an image of the selection frame with the smallest frame number to the subsequent representative frame display control unit 530.

The representative frame display control unit 530 controls the display unit 600 to display images output from the representative frame candidate similarity determination unit 520 as those of representative frames which represent the moving image.

Figure 8:
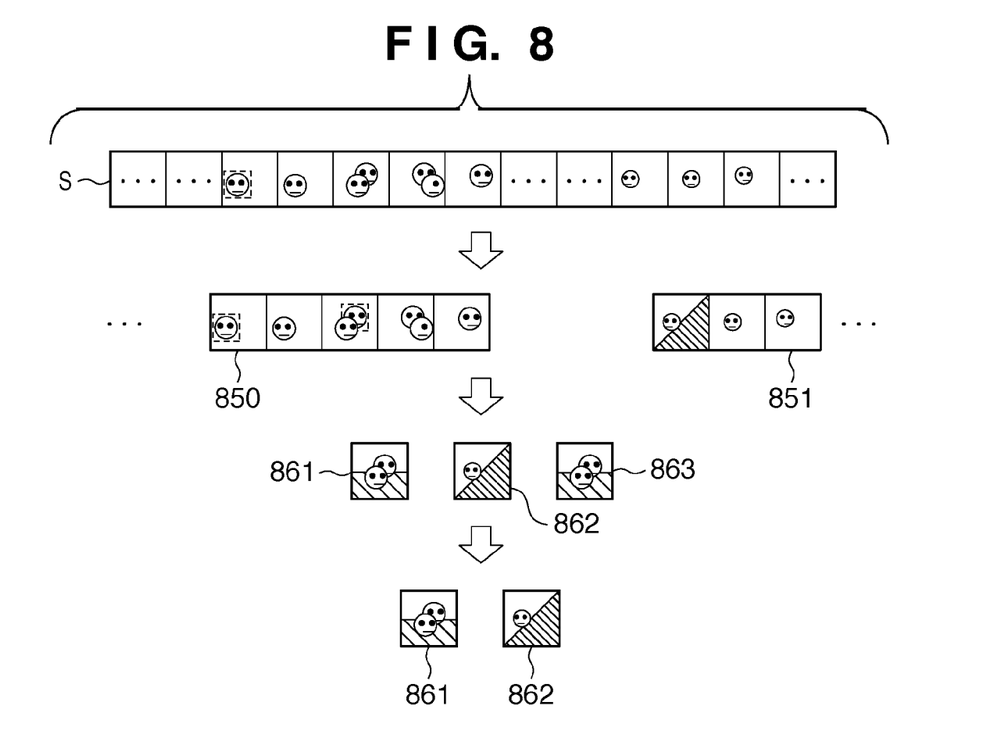
FIG. 8 is a view for explaining processing for deciding representative frames which represent a moving image.

FIG. 8 is a view for explaining the aforementioned processing for deciding representative frames that represent a moving image from this moving image. Referring to FIG. 8, reference symbol S denotes a moving image, and reference numerals 850 and 851 respectively denote subframe sequences obtained from this moving image S. Assume that faces which appear in respective frames are those which are registered in advance. Therefore, in this case, in the subframe sequence 850, since frames which include a largest number of face images are the third and fourth frames, an image of the third frame closer to the start frame is selected as an image 861 of a selection frame of the subframe sequence 850. In the subframe sequence 851, since all frames include the same number of face images, an image of the first frame closest to the start frame is selected as an image 862 of a selection frame of the subframe sequence 851. Reference numeral 863 denotes an image of a selection frame selected from a subframe sequence after the subframe sequence 851.

As the next processing, processing for deciding images to be displayed from the images 861, 862, and 863 of the selection frames, that is, representative frames which represent the moving image S is executed. Since the image 861 is selected as an image to be displayed, whether or not the images 862 and 863 are selected as images to be displayed is then decided. Since the image 862 is not similar to the image 861, it is selected as an image to be displayed. However, since the image 863 is similar to the image 861, it is not selected as an image to be displayed.

Figure 2:
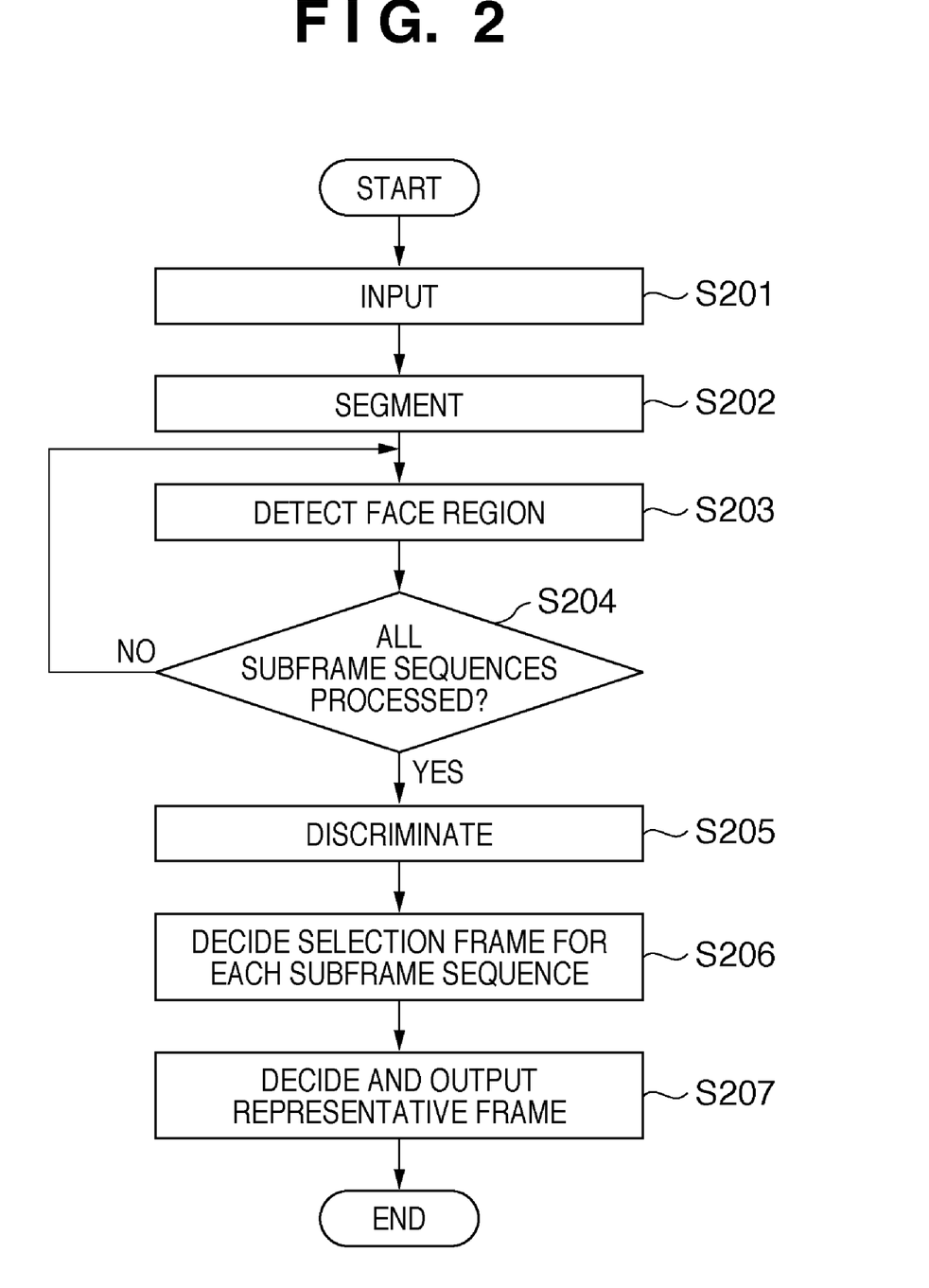
FIG. 2 is a flowchart of processing for deciding and displaying images of representative frames for one moving image.

FIG. 2 is a flowchart of the aforementioned processing for deciding and displaying images of representative frames for one moving image. Note that the following description will be given under the assumption that each pixel of an image of each frame which forms a moving image is defined by an 8-bit R component, 8-bit G component, and 8-bit B component.

In step S201, the image input unit 100 inputs moving image data, and stores the input moving image data in the subsequent image memory 200. When moving image data is compressed by a compression scheme such as MPEG or JPEG, the image input unit 100 decompresses this moving image by a decompression scheme corresponding to the compression scheme, and outputs the decompressed data to the image memory 200.

In step S202, the cut point detection unit 310 segments a frame sequence which forms a moving image represented by the data read out from the image memory 200 into one or more subframe sequences. In this processing, the cut point detection unit 310 calculates an average pixel value of an image of each frame in turn from the start frame. The average pixel value is a result obtained by adding the pixel values of all pixels which form one image, and dividing the sum by the total number of pixels which form the image. Then, the cut point detection unit 310 calculates a correlation value (color correlation value) between the average pixel value calculated for the current reference frame, and that calculated for the immediately preceding reference frame. When the calculated correlation value is smaller than a threshold, the cut point detection unit 310 determines an image of the current reference frame as a division frame, and sets that division frame as a start frame of a new subframe sequence. On the other hand, when the calculated correlation value is equal to or larger than the threshold, the cut point detection unit 310 sets the current reference frame as a trailing end frame of a subframe sequence to which an image of the immediately preceding reference frame belongs.

In step S203, the face detection unit 320 selects one of one or more subframe sequences segmented in step S202 as a processing target. The face detection unit 320 detects a face region from an image with reference to images of respective frames which form the subframe sequence selected as a processing target (subframe sequence to be processed). Various face region detection techniques are available, and a face region may be detected using any of these techniques in this embodiment. The face region detection techniques include a technique disclosed in, for example, "Rowley et al, "Neural network-based face detection", IEEE TRANSACTIONS ON PATTERN ANALYSIS AND MACHINE INTELLIGENCE, VOL. 20, NO. 1, January 1998". The face region detection techniques also include a technique disclosed in, for example, "Yang et al, "Detecting Faces in Images: A Survey", IEEE TRANSACTIONS ON PATTERN ANALYSIS AND MACHINE INTELLIGENCE, VOL. 24, NO. 1, January 2002".

The face detection unit 320 outputs data of images of respective frames which form the subframe sequence to be processed and face region information to the subsequent face discrimination unit 330.

It is determined in step S204 if all the subframe sequences have undergone face region detection in step S203. If YES in step S204, the process advances to step S205. On the other hand, if subframe sequences to be processed still remain, the process returns to step S203 to execute face region detection of the next subframe sequence to be processed.

In step S205, the face discrimination unit 330 reads out data of human faces (dictionary data), which are registered in advance, from the dictionary DB 331. The face discrimination unit 330 executes the following processing for each subframe sequence. That is, the face discrimination unit 330 identifies frames from which face regions are detected with reference to the face region information of respective frames which form one subframe sequence. Then, the face discrimination unit 330 identifies a face region in each identified frame with reference to the face region information of that frame. When a face in the identified face region is that which is registered in advance, the face discrimination unit 330 outputs a set of the face region information of this frame and a code associated with that face to the face sequence storage unit 340 as face sequence information.

Figure 3:
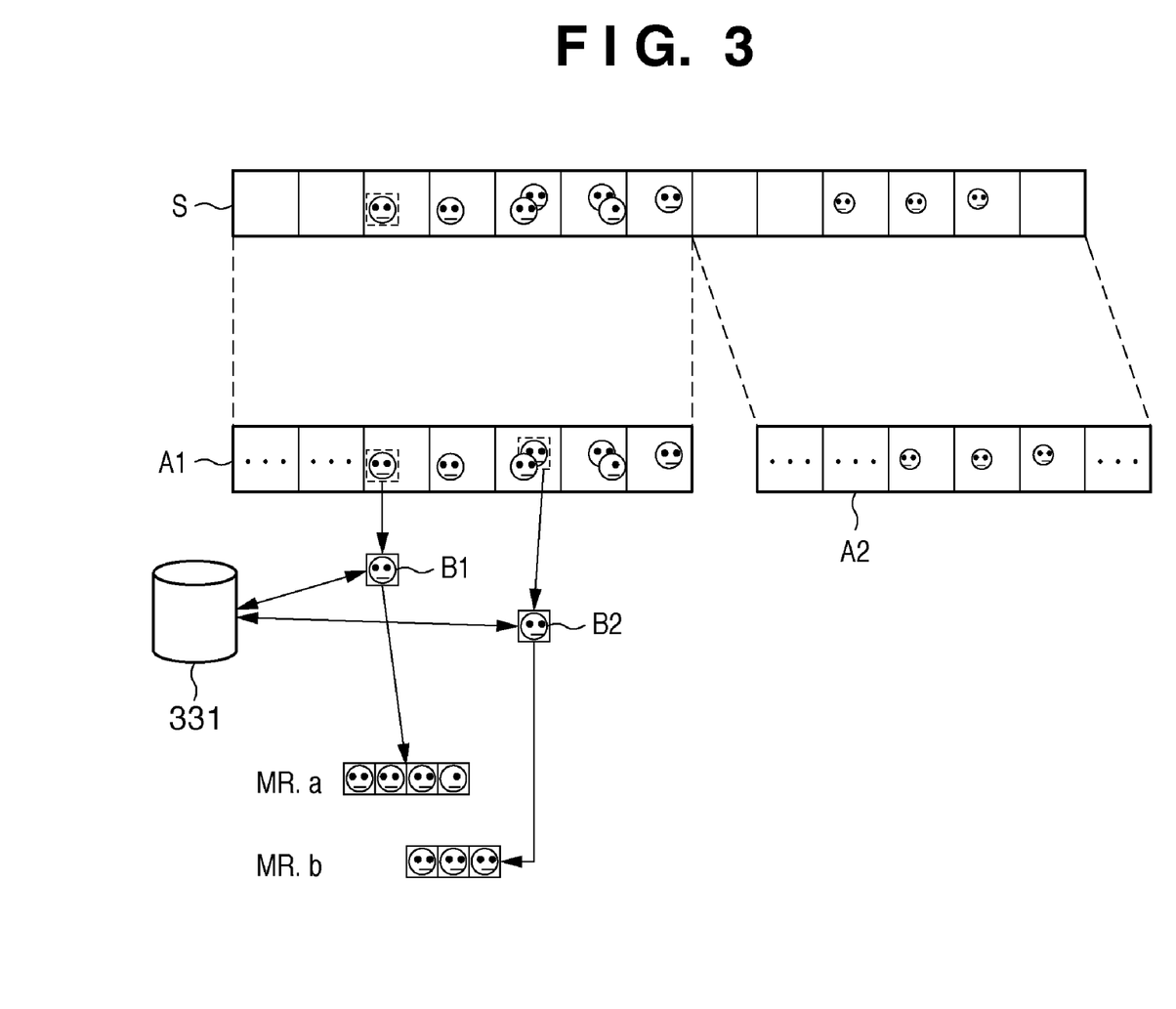
FIG. 3 is a view for explaining the processes in steps S201 to S205.

FIG. 3 is a view for explaining the processes from step S201 (moving image input) to step S205 (face sequence output). Referring to FIG. 3, reference symbol S denotes a moving image. This moving image S is segmented into subframe sequences A1 and A2. In FIG. 3, when a face B1 is detected from the subframe sequence A1, it is collated with dictionary data registered in the dictionary DB 331, and is recognized to be that of Mr. a. Also, in FIG. 3, when a face B2 is detected from the subframe sequence A1, it is collated with dictionary data registered in the dictionary DB 331, and is recognized to be that of Mr. b. Note that the face discrimination technique uses a technique disclosed in, for example, U.S. Pat. No. 4,165,992.

In step S206, the representative frame candidate extraction unit 410 executes the following processing for each subframe sequence. The representative frame candidate extraction unit 410 counts the number of face codes recorded in respective pieces of face sequence information with reference to the face sequence information stored and held in the face sequence storage unit 340 in correspondence with one subframe sequence. The representative frame candidate extraction unit 410 selects a frame including a largest number of face images (faces which are registered in the dictionary data) as a selection frame (selection image). If there is a plurality of selection frame candidates, the representative frame candidate extraction unit 410 selects a frame having a smallest frame number (closer to the start frame) as a selection frame. The representative frame candidate extraction unit 410 stores image data of the selection frames for respective subframe sequences, and face sequence information in the representative frame candidate storage unit 420.

In step S207, upon reception of image data of the selection frames, the representative frame candidate feature amount extraction unit 510 calculates an average pixel value of pixels which form an area (background area) other than a face region of each image data.

The representative frame candidate similarity determination unit 520 calculates correlation values between the average pixel value calculated for the selection frame with the smallest frame number and those calculated for other selection frames. The representative frame candidate similarity determination unit 520 outputs an image of the selection frame whose correlation value with the average pixel value, which is calculated for the selection frame with the smallest frame number, is smaller than a threshold, and an image of the selection frame with the smallest frame number to the subsequent representative frame display control unit 530.

The representative frame display control unit 530 controls the display unit 600 to display images output from the representative frame candidate similarity determination unit 520 as those of representative frames which represent the moving image. Note that the output destination of the representative frame images is not limited to the display unit 600, but various other output destinations are available. For example, the representative frame images may be stored in a memory.

Figure 4:
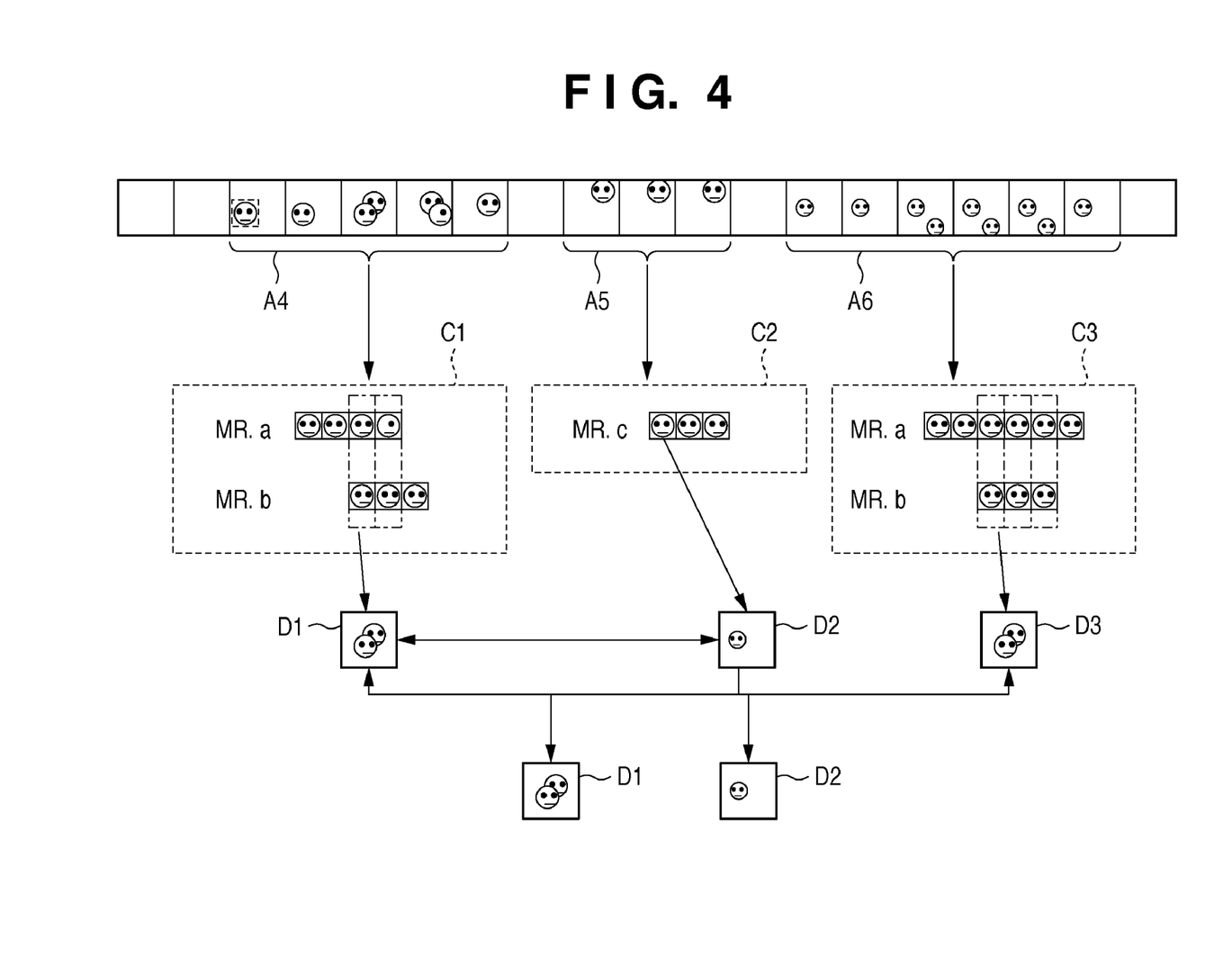
FIG. 4 is a view for explaining the processes in steps S206 and S207.

FIG. 4 is a view for explaining the processes in steps S206 and S207.

Reference numerals A4, A5, and A6 denote subframe sequences obtained from an identical moving image.

As denoted by reference numeral C1, Mr. a's face (a face registered in advance) appears in the first to fourth frames in the subframe sequence A4, and Mr. b's face (a face registered in advance) appears in the third to fifth frames. Therefore, in the subframe sequence A4, two faces appear in each of the third and fourth frames, and these two frames are those including a largest number of face images. Hence, of these two frames, an image of the third frame closer to the start frame is selected as an image D1 of a selection frame for this subframe sequence A4.

On the other hand, as denoted by reference numeral C2, only Mr. c's face (a face registered in advance) appears in all frames of the subframe sequence A5. Therefore, in the subframe sequence A5, an image of the first frame closer to the start frame is selected as an image D2 of a selection frame for this subframe sequence A5.

Furthermore, as denoted by reference numeral C3, in the subframe sequence A6, Mr. a's face appears in the first to sixth frames, and Mr. c's face appears in the third to fifth frames. Therefore, in the subframe sequence A6, two faces appear in each of the third to fifth frames, and these three frames are those including a largest number of face images. Therefore, of the third to fifth frames, an image of the third frame closer to the start frame is selected as an image D3 of a selection frame for this subframe sequence A6.

Next, similarity comparison processing is executed between the images D1 and D2, and between the images D1 and D3.

An example of the similarity comparison processing between images will be described below with reference to FIG. 6.

The representative frame candidate feature amount extraction unit 510 segments a comparison target image 690 into a plurality of blocks. Reference numeral 691 denotes an image obtained when the comparison target image 690 is segmented into a plurality of blocks, and segmented blocks are indicated by the dotted lines. The representative frame candidate similarity determination unit 520 calculates an average value of pixel values of pixels in each block. Reference numeral 692 denotes an image obtained when each block is filled with pixels having a corresponding average pixel value. Upon comparing two images, the representative frame candidate similarity determination unit 520 compares the average pixel values of positionally corresponding blocks between these images, and accumulates their differences (absolute values) for all the blocks. When the accumulated value is equal to or larger than a threshold, the representative frame candidate similarity determination unit 520 determines that these images have no similarity. Of course, the similarity determination processing is not limited to the aforementioned processing.

As a result of such similarity determination processing, it is determined that the images D1 and D2 have no similarity, and it is determined that the images D1 and D3 have similarity. Therefore, the images D1 and D2 are selected as representative frames as images to be displayed.

In this embodiment, the display unit 600 displays only images of representative frames which represent a moving image. However, the display unit 600 may display other kinds of information. For example, upon deciding representative frames, whose face appears in an image of each representative frame is determined as a face code. Hence, the display unit 600 may display this face code, and the name of a person corresponding to this face code.

[Second Embodiment]

Figure 6:
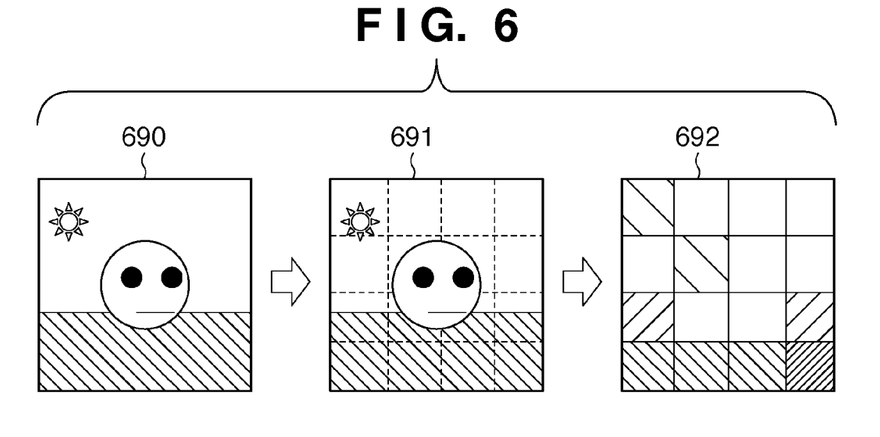
FIG. 6 is a view for explaining an example of similarity comparison processing between images.

In the first embodiment, as an example of the similarity comparison processing between images, the comparison target image 690 is segmented into a plurality of blocks, and an average value of pixel values of pixels in each block is calculated, as shown in FIG. 6. Upon comparing two images, the average pixel values of positionally corresponding blocks between these images are compared, and their differences are accumulated for all the blocks. When the accumulated value is equal to or larger than the threshold, it is determined that there is no similarity between these images.

This embodiment excludes blocks included in a face region and a region below the face region from such processing.

Figure 7:
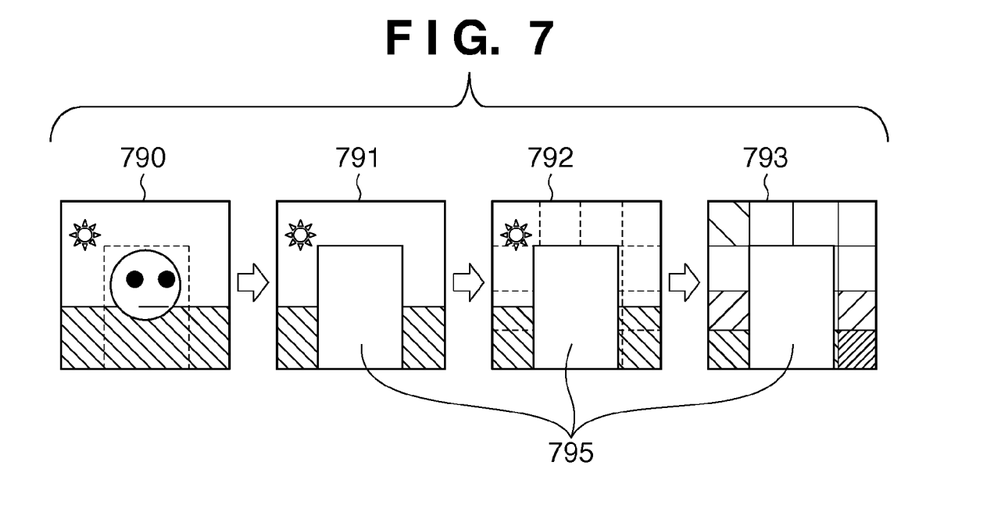
FIG. 7 is a view for explaining the similarity comparison processing between images.

FIG. 7 is a view for explaining the similarity comparison processing between images according to this embodiment.

The representative frame candidate feature amount extraction unit 510 identifies a face region and a region below the face region in a comparison target image 790. In FIG. 7, a region indicated by the dotted line in the comparison target image 790 indicates a total of the face region and a region below that face region. Although the same applies to the first embodiment, the shape of a region to be identified (detected or extracted) is not limited to a rectangle, but regions having other shapes such as a circular shape and elliptic shape may be identified. The representative frame candidate feature amount extraction unit 510 excludes the face region and the region below that face region from the subsequent processing in the comparison target image 790. Reference numeral 791 denotes an image obtained by painting the region excluded from the processing in the comparison target image 790.

The representative frame candidate feature amount extraction unit 510 segments the image 791 into a plurality of blocks. Reference numeral 792 denotes an image obtained when the image 791 is segmented into a plurality of blocks, and the segmented blocks are indicated by the dotted lines. The representative frame candidate similarity determination unit 520 calculates the average value of pixel values of pixels in each block. Reference numeral 793 denotes an image obtained when each block is filled with pixels having a corresponding average pixel value. The subsequent processing is the same as that of the first embodiment.

[Third Embodiment]

In the first and second embodiments, in order to execute the processing for segmenting one moving image into one or more subframe sequences, that is, the processing for segmenting a moving image into scenes, the average pixel value of each image is calculated, and a correlation value of the average pixel values is calculated between images. However, the following processing may be executed to segment one moving image into one or more subframe sequences.

That is, processing for segmenting one image into a plurality of blocks and calculating an average pixel value in each block is executed for respective frame images. Then, images are referred to in turn from the start frame, and differences (absolute values) of average pixel values of positionally corresponding blocks between the current reference frame image and immediately preceding reference frame image are calculated. When the total value of the differences calculated for respective blocks is equal to or larger than a threshold, the current reference frame image is determined as a division frame, which is set as a start frame of a new subframe sequence. On the other hand, when the total value is smaller than the threshold, the current reference frame is set as a trailing end frame of a subframe sequence to which the immediately preceding reference frame image belongs.

[Fourth Embodiment]

To the image processing apparatus used in the above embodiments, a dedicated apparatus, PC (personal computer), and the like, which are used to play back a moving image, are applicable.

Figure 5:
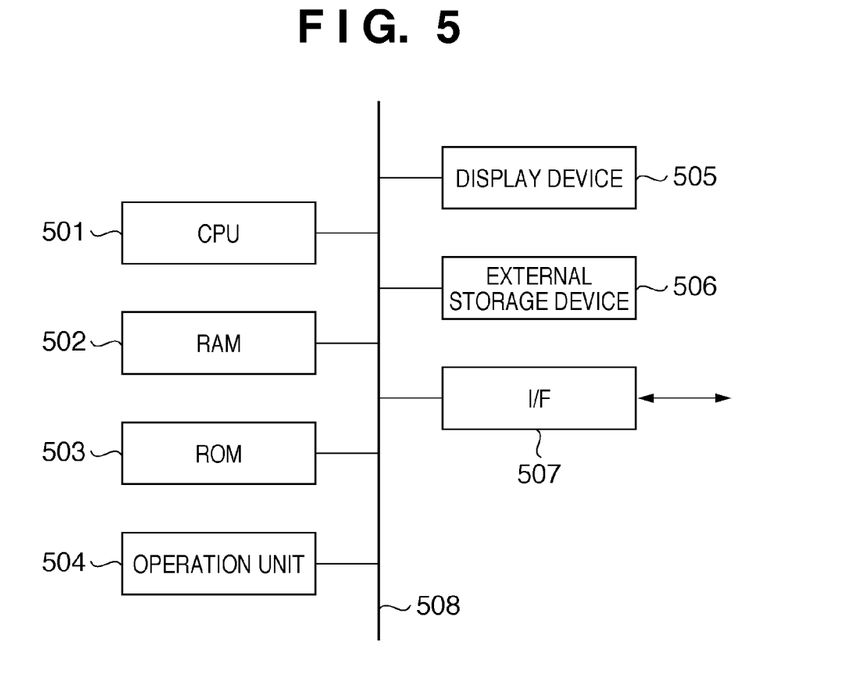
FIG. 5 is a block diagram showing an example of the hardware arrangement of a computer which is applicable to the image processing apparatus used in each embodiment.

FIG. 5 is a block diagram showing an example of the hardware arrangement of a computer which is applicable to the image processing apparatus used in the above embodiments.

A CPU 501 controls the overall computer and executes respective processes described above as those to be implemented by the image processing apparatus using computer programs and data stored in a RAM 502 and ROM 503.

The RAM 502 has an area for temporarily storing computer programs and data loaded from an external storage device 506, data externally received via an I/F (interface) 507, and the like. The RAM 502 also has a work area used when the CPU 501 executes various kinds of processing. That is, the RAM 502 can provide various areas as needed. For example, the RAM 502 also serves as the image memory 200, face sequence storage unit 340, and representative frame candidate storage unit 420 shown in FIG. 1.

The ROM 503 stores setting data, a boot program, and the like of this computer.

An operation unit 504 includes a keyboard and mouse. When an operator of this computer operates the operation unit 504, he or she can input various instructions to the CPU 501. For example, the operator can input a moving image acquisition instruction or the like using this operation unit 504.

A display device 505 includes a CRT or liquid crystal display panel, and can display the processing result of the CPU 501 by means of images, characters, and the like. The display device 505 corresponds to the display unit 600 shown in FIG. 1.

The external storage device 506 is a large-capacity information storage device represented by a hard disk drive. The external storage device 506 saves an OS (operating system), and computer programs and data for making the CPU 501 execute the aforementioned processes described as those to be implemented by the image processing apparatus. These computer programs include those which make the CPU 501 execute the functions of the following units shown in FIG. 1.

the cut point detection unit 310 the face detection unit 320 the face discrimination unit 330 the representative frame candidate extraction unit 410 the representative frame candidate feature amount extraction unit 510 the representative frame candidate similarity determination unit 520 the representative frame display control unit 530

Also, the external storage device 506 saves the dictionary DB 331 shown in FIG. 1.

The computer programs and data saved in the external storage device 506 are loaded onto the RAM 502 as needed under the control of the CPU 501, and are to be processed by the CPU 501.

The I/F 507 serves as the image input unit 100 shown in FIG. 1. Moving image data supplied from an image sensing device or a device on a network is output to the external storage device 506 and RAM 502 via this I/F 507.

Reference numeral 508 denotes a bus which interconnects the aforementioned units.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-179458 filed Jul. 9, 2008 which is hereby incorporated by reference herein in its entirety.

What is claimed is:

1. An image processing apparatus comprising:
a segmentation unit which segments a frame sequence including successive frames into one or more subframe sequences;
a selection unit which, for each of the one or more subframe sequences, identifies an image group, in which an object registered in advance appears, of images of respective frames that form one subframe sequence, and selects one image from the identified image group as a selection image; and
an output unit which outputs selection images selected for respective subframe sequences by said selection unit as representative images of the frame sequence;
wherein said selection unit selects, for respective subframe sequences, an image including a largest number of object images registered in advance of images of respective frames that form one subframe sequence as a selection image for the one subframe sequence.

2. The apparatus according to claim 1, wherein said segmentation unit calculates a color correlation value between an x ($x=1, 2, \ldots$)-th frame image and an (x+1)-th frame image, puts the x-th frame image and the (x+1)-th frame image in an identical subframe sequence when the calculated correlation value is not less than a threshold, and puts the (x+1)-th frame image in a subframe sequence different from a subframe sequence to which the x-th frame image belongs when the correlation value is smaller than the threshold.

3. The apparatus according to claim 1, wherein when there are a plurality of frame images including a largest number of object images registered in advance of respective frames that form the one subframe sequence, said selection unit selects an image of a frame closest to a start frame from the plurality of frame images as a selection image for the one subframe sequence.

4. The apparatus according to claim 1, wherein said output unit calculates correlation values between a background area of a selection image with a smallest frame number and background areas of other selection images, and outputs a selection image whose correlation value with the selection image with the smallest frame number is smaller than a threshold, and the selection image with the smallest frame number.

5. An image processing method comprising:
a segmentation step of segmenting a frame sequence including successive frames into one or more subframe sequences;
a selection step of, for each of the one or more subframe sequences, identifying an image group, in which an object registered in advance appears, of images of respective frames that form one subframe sequence, and selecting one image from the identified image group as a selection image; and
an output step of outputting selection images selected for respective subframe sequences in the selection step as representative images of the frame sequence;
wherein said selection step selects, for respective subframe sequences, an image including a largest number of object images registered in advance of images of respective frames that form one subframe sequence as a selection image for the one subframe sequence.

6. A computer-readable storage medium storing a computer program for making a computer function as respective units included in an image processing apparatus which includes a segmentation unit that segments a frame sequence including successive frames into one or more subframe sequences, a selection unit that, for each of the one or more subframe sequences, identifies an image group, in which an object registered in advance appears, of images of respective frames that form one subframe sequence, and selects one image from the identified image group as a selection image; and an output unit which outputs selection images selected for respective subframe sequences by said selection unit as representative images of the frame sequence, said method comprising:
a segmentation step of segmenting a frame sequence including successive frames into one or more subframe sequences;
a selection step of, for each of the one or more subframe sequences, identifying an image group, in which an object registered in advance appears, of images of respective frames that form one subframe sequence, and selecting one image from the identified image group as a selection image; and
an output step of outputting selection images selected for respective subframe sequences in the selection step as representative images of the frame sequence;
wherein said selection step selects, for respective subframe sequences, an image including a largest number of object images registered in advance of images of respective frames that form one subframe sequence as a selection image for the one subframe sequence.

* * * * *